United States Patent Office 3,242,049
Patented Mar. 22, 1966

3,242,049
PROCESS FOR MAKING ENTERICALLY USEFUL COMPLEX OF SPIRAMYCIN AND PRODUCT THEREOF
Paul O'Brien, Dayton, and Harry L. Roe, Jr., Centerville, Ohio, assignors to The National Cash Register Company, Dayton, Ohio, a corporation of Maryland
No Drawing. Filed May 20, 1963, Ser. No. 281,768
2 Claims. (Cl. 167—65)

This invention relates to a process for making a palatable enteric sustained-release medicament, and to its product.

Many medicines, which are unpalatable because of bitterness, must be given orally in a protective coating so that they may be tolerated. If such medicines are to be released enterically in a sustained manner, there is a three-fold problem to be solved; namely, (1) Palatability
(2) Enteric release
(3) Sustained release This invention has provided a process for treating basic-reacting medicaments with acid-reacting physiologically-compatible film-forming protective material, to form an acid-base complex that satisfies the three requirements without substantially interfering with the potency of the medicament component.

For the acid-reacting component there is used cellulose acetate hydrogen phthalate, a well-known and physiologically-acceptable enteric film-forming protective material.

For illustrating the basic-reactant component there is used, as the preferred example, the antibiotic spiramycin, and as a second example there is used dextromethorphan, both obnoxiously bitter in taste and adapted for enteric use.

In each example, the basic-reactant medicament and the acid-reactant protective material are brought together in liquid solution, in which they react to form a fine solid precipitate of particulate state. This precipitate may be reduced in size so as to provide the desired release time-span in the intestinal tract, or tableted to achieve a longer sustained release time-span. By forming the particulate complex, the entire dissolution of each particle from the surface inwardly accounts for the release rate of the medicament component, which is not the case in the dissolution of a protective film coating of an entire tablet or in the case of the rupture of a coating comprising a capsule wall for the entire dosage. The particle sizes of the complex particles going into a dose may be selected so as to provide the desired release-rate of the material, the total surface area of the remaining particles of a dose giving the release rate at a given instant. It is apparent that a dose may consist of particles of various predetermined sizes or of various reacted materials.

While the invention finds its primary use in the mentioned three respects, its utility may reside in any one of the characteristics mentioned; that is to say, (1) palatability, (2) enteric release, or (3) sustained release. It is possible, of course, to provide the complex with flavors or colors for aesthetic or identification purposes. If desired, suspensions of the complex material provided by the process may be made in suitable liquid or solid vehicles, and mixtures of the novel complexes may be made with other therapeutically necessary materials not necessarily made according to this invention.

The invention is deemed applicable to acid-base reactions between film-formers of physiological merit and medicaments in general, to produce the desired reaction product.

In practicing the process, it is best to use an excess of the film-forming acid-reactant material in the reaction mixture, to insure complete reaction of the obnoxious medicament, the excess film-former in unreacted condition remaining as an innocuous residue which, if of sufficient amount, may itself be of value in delaying enteric release of the complex by its mere physical presence.

EXAMPLE I

In this, the preferred example, acetone is used as a common solvent vehicle for reacting, at room temperature, spiramycin with cellulose acetate hydrogen phthalate.

Specifically, spiramycin is best defined as it appears in the publication "The Merck Index," seventh edition, published by Merck & Co., Inc., Rahway, New Jersey, United States of America, in 1960; to wit, page 972:

"Spiramycin. Sequamycin; Selectomycin; Rovamycin; 5337 R.P.; Provamycin; R.P. 5337. C 60.7%. H 9.0%, N 3.2%, O 27.1% (by analysis).

$C_{22-24}H_{34-44}NO_{7-8}$

Antibiotic substance classified in the erythromycin-carbomycin group and produced by Streptomyces ambofaciens from soil of northern France: Cosar, Ninet, Pinnert, Preud'homme Rhône-Poulenc], Compt. rend. soc. biol. 234, 1498 (1952); Antibiotics Annual 1954–1955, 724.

"Amorphous base, slightly soluble in water. Soluble in most organic solvents. $[\alpha]_D^{20}$ —80° (c.=1 in methanol). Adsorption max. 231 mµ.

"Sulfate, crystals, soluble in water, methanol, ethanol, butanol.

"Active on Gram-positive bacteria and rickettsiae. Cross resistance between microorganisms resistant to erythromycin and carbomycin."

Cellulose acetate hydrogen phthalate has the structural formula:

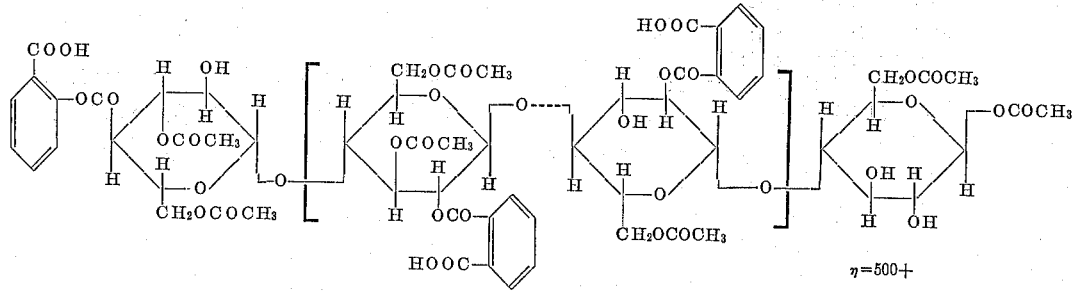

$\eta = 500+$ where "n" is chosen with a view to making a 15% solution of it, in acetone at room temperature (25 degrees centigrade ±5 degrees), to have an approximate viscosity of 50–90 centipoises, and to have an esterified phthalyl content of 30%–40%, a free acid content of 6% maximum, and an esterified acetyl content of 17%–22%, by weight. Specifically, one part of solution A is mixed with one part of Solution B at room temperature, and the reaction proceeds forthwith.

Solution A

| | Grams |
|---|---|
| Acetone | 1897 |
| Cellulose acetate hydrogen phthalate (as specified) | 41 |

Solution B

| | |
|---|---|
| Acetone | 788 |
| Spiramycin (as specified) | 41 |

The equal actual weights in grams of the combining materials are of no significance, as molecularly there is present an excess of the cellulose acetate hydrogen phthalate to assure complete reaction of the spiramycin. The yield was 73 grams of the complex as compared with a theoretical yield of 82 grams, or 89% of the calculated yield.

EXAMPLE II

In this example, dextromethorphan is substituted for the spiramycin of Example I, in substantially the same weight proportions to provide the excess of the cellulose acetate hydrogen phthalate.

Dextromethorphan has the structure

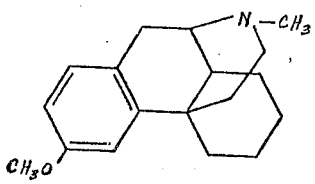

and acts basically.

Comparable taste-masking, medicinal efficacy, and yields were obtained as were obtained in Example I.

The concept of forming acid-base complexes in acetone solutions of cellulose acetate hydrogen phthalate and a basic-reactant material is applicable to all kinds of base-reacting medicaments, be they orally repulsive or not, the enteric sustained release characteristics of the complexes being of importance in and of themselves apart from taste masking.

It is within the concept of the invention to employ other acid-reacting film-forming enteric materials than the specified cellulose acetate hydrogen phthalate to react with spiramycin or dextromethorphan, and to employ different kinds of reactant complexes combined in the same dosage, all to the end result specified.

The reaction may take place in other solvents than acetone, acetone having been specified as preferred as eminently suitable for pharmaceutical products. Other solvents and solvent systems that are suitable for use are listed in the following group:

Methyl ethyl ketone
Diacetone alcohol
Dioxane
Methanol:acetone 1:1
Methanol:acetone 3:1
Methanol:benzene 1:1
Ethyl acetate:isopropanol 1:1
Furfuryl alcohol Furthermore, the indications are that mixtures of solvents will work in the process; for instance, an acetone solution of cellulose acetate hydrogen phthalate will react with spiramycin dissolved in any one of the group of solvents named, with comparable yields.

EXAMPLE III

This is the same as Example I except that the spiramycin is dissolved in 788 grams of methyl ethyl ketone instead of acetone to make Solution B, which is then mixed with Solution A.

EXAMPLE IV

This is the same as Example II except that the dextromethorphan is mixed with dioxane.

EXAMPLE V

This is the same as Example I except that double the amount of Solution A is used to form a great excess of cellulose acetate hydrogen phthalate in the final product to provide greater taste-masking and sustained release by "bulking" the complex with unreacted protective material. The amount of such excess is a matter of choice, up to four times as much providing a useful product.

EXAMPLE VI

This is the same as Example II except that Solution A is formed of double the amount of cellulose acetate hydrogen phthalate, one half of which is dissolved in acetone to form a first solution, and the other half is dissolved in a one-to-one mixture of methanol and benzene to form a second solution, the first and second solutions being mixed together, and the result mixed with Solution B.

What is claimed is:

1. The acid-base reaction product of spiramycin and cellulose acetate hydrogen phthalate.

2. The acid-base reaction product of dextromethorphan and cellulose acetate hydrogen phthalate.

References Cited by the Examiner

UNITED STATES PATENTS

| | | | |
|---|---|---|---|
| 2,866,735 | 12/1958 | Himelick | 167—82 |
| 3,000,785 | 9/1961 | Ninet et al. | 167—65 |
| 3,081,233 | 3/1963 | Enz et al. | 167—82 |
| 3,121,043 | 2/1964 | Tobin et al. | 167—82 |

FOREIGN PATENTS

| | | |
|---|---|---|
| 561,936 | 8/1958 | Canada. |

OTHER REFERENCES

New and Nonofficial Drugs, J. J. Lippincott, Philadelphia, Pa. (1961), p. 385.

JULIAN S. LEVITT, *Primary Examiner.*

FRANK CACCIAPAGLIA, JR., *Examiner.*